A. L. McGREGOR.
AUTOMOBILE BUFFER.
APPLICATION FILED AUG. 28, 1908.
929,159.
Patented July 27, 1909.
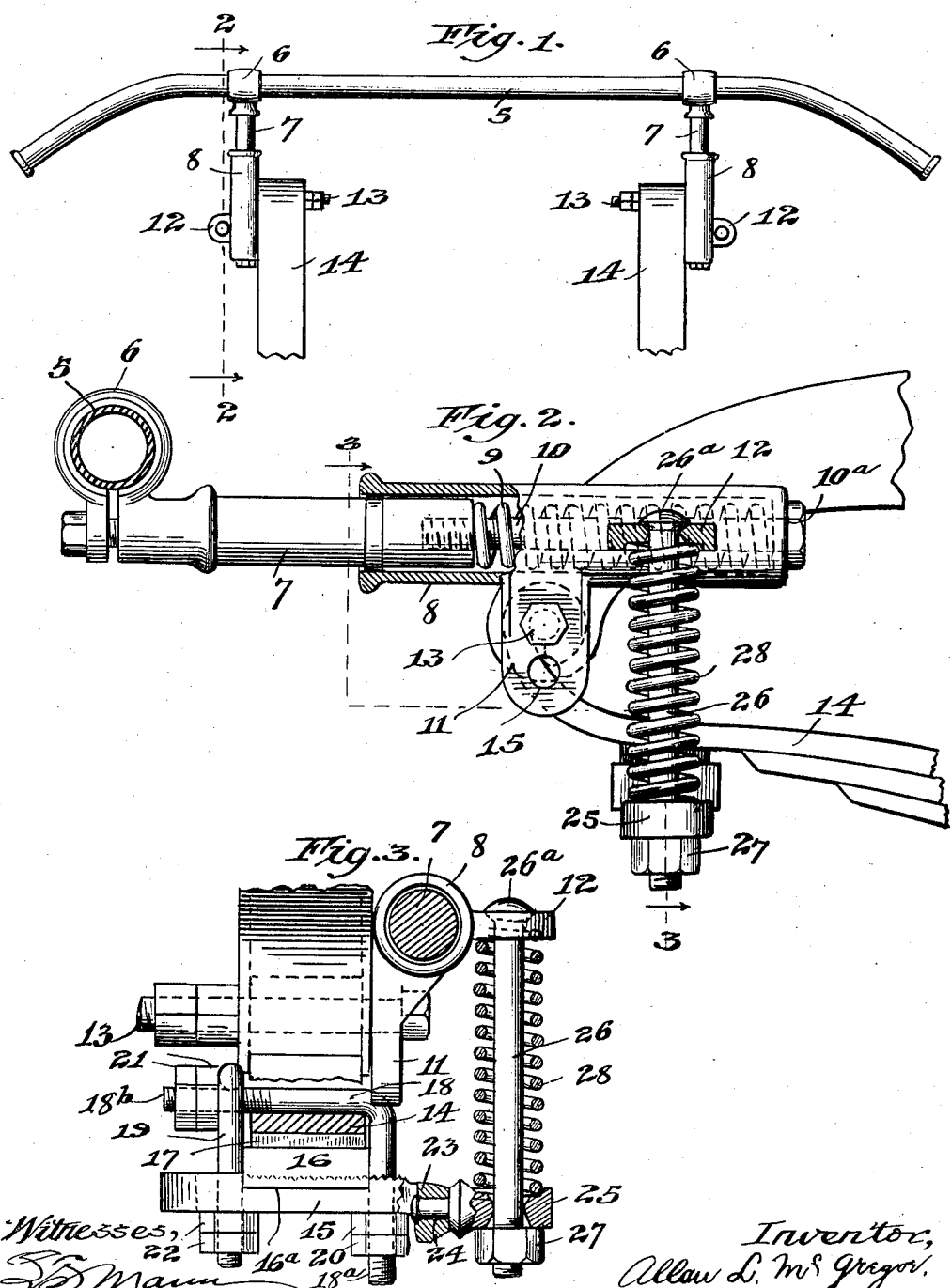
Witnesses,
James R. Offield.
Inventor,
Allan L. McGregor.
By Offield, Towle & Linthicum,
Attys.

UNITED STATES PATENT OFFICE.

ALLAN L. McGREGOR, OF DULUTH, MINNESOTA.

AUTOMOBILE-BUFFER.

No. 929,159.      Specification of Letters Patent.     Patented July 27, 1909.

Application filed August 28, 1908. Serial No. 450,694.

*To all whom it may concern:*

Be it known that I, ALLAN L. MCGREGOR, a citizen of the United States, residing at Duluth, in the county of St. Louis and State of Minnesota, have invented certain new and useful Improvements in Automobile-Buffers, of which the following is a specification.

This invention relates to buffers intended for use on automobiles, and pertains more especially to that type wherein a horizontally disposed buffer-bar is elastically mounted upon and in advance of the usual elliptic springs supporting the forepart of the automobile body.

The invention has for its general object to provide an improved buffer of this type wherein the buffer-bar may be capable of a yielding movement in a substantially horizontal plane and wherein the buffer-bar and its yielding supports may be mounted and supported wholly upon and by the forward ends of the forward elliptic springs supporting the body. In order to accomplish this latter mode of attachment and support, the compressing and expanding movements of the elliptic springs must be taken into account; and the principal novel features of my present invention reside in the means whereby the buffer-bar is mounted and supported in the manner described upon the forward ends of said elliptic springs.

The invention will be readily understood when considered in connection with the accompanying drawings, which show one practical mechanical embodiment thereof, and in which,—

Figure 1 is a top plan view of my improved automobile buffer showing also the forward ends of the front elliptic springs on which the same is mounted. Fig. 2 is an enlarged cross-sectional view on the line 2—2 of Fig. 1, looking in the direction indicated by the arrows, the cushioning cylinder being partly in longitudinal section. Fig. 3 is a similar enlarged detail view substantially on the offset line 3—3 of Fig. 2, viewed in the direction indicated by the arrows.

Referring to the drawing, 5 designates the buffer-rod in the usual form, the same being directly mounted in collars 6 rigid with the outer ends of a pair of plungers 7, which latter are slidably supported in cylinders 8, being normally thrust forwardly by cushioning springs 9 confined within said cylinders between the inner ends of the plungers and the inner or closed ends of the cylinders, as clearly shown in Fig. 2. To limit the outward thrust of the plungers, a bolt 10 is passed through an aperture in the inner end of each cylinder and, extending through the spring 9, is screwed into the inner end of the plunger, the head 10ᵃ of the bolt acting in coöperation with the end of the cylinder, as a stop to limit the extent of outward travel of the plunger.

The cylinder 8 has cast therewith a depending lug 11 and a horizontally extending lug 12. The lug 11 is provided with an aperture through which is designed to pass the usual pivot bolt 13 by which the forward meeting ends of the upper and lower leaves of the elliptic spring 14 are hinged together, the lug being preferably, and as herein shown, provided with two or more such apertures 15, which adapt the device for connection to springs of various heights and shapes. It will thus be observed that the hinge bolts 13 of the springs constitute the supports for the weight of the buffer-rod and its cushioning devices. In order to maintain the substantially horizontal position of the buffer-rod cushioning devices, I provide a further attachment of the cushioning cylinders 8 to the lower leaves of the springs, which attachment is of such a character as to not interfere with the free action of the springs while at the same time maintaining the desired position of the buffer-bar and its cushioning devices and contributing to the proper and adequate support of these parts to resist shocks and strains to which the buffer-bar may be subjected. This auxiliary attachment comprises, as best shown in the detail view, Fig. 3 a clamp adapted to securely embrace the lower leaf of the spring 14 and a flexible connection between said clamp and the horizontal lug 12 of the cushioning cylinder. The clamp, as herein shown, comprises a lower jaw 15 longitudinally slotted and formed with a serrated upper face, a saddle 16 having a correspondingly serrated lower face mounted therein and provided with depending guide-ribs 16ᵃ overlapping the sides of the jaw 15, a rubber cushion 17 mounted in the saddle 16, an upper jaw 18 formed by a rectangularly bent rod provided with threaded ends 18ᵃ and 18ᵇ and an eye-bolt 19, the upper or eye end of which receives the threaded end 18ᵇ of the jaw while its lower end engages the slot of the lower jaw 15. Suitable nuts 20, 21 and 22 on the threaded ends of the jaw 18 and the bolt 19 constitute the securing and tightening means of the clamp, which, by reason of the slotted lower jaw, is adjustable laterally as well as longitudinally of the spring. On that end of the jaw member 15 which directly underlies the cushioning cylinder is formed a bearing 23 for the pivot-pin 24 of a swiveled lug 25. Both of the lugs 12 and 25 are centrally apertured, the openings therethrough being preferably, and as herein shown, tapered or flared on both sides so as to form bearings for a connecting bolt 26 passed therethrough that will permit a limited angular movement in any direction of said bolt therein. The bolt 26 has a rounded head 26ª at its upper end having a loose or swiveling fit in the aperture of the lug 12 and a nut 27 on its lower end beneath the swiveled lug 25. Surrounding the bolt 26 is a coil spring 28 maintained under compression, and forcing apart the lugs 12 and 15 to the full extent permitted by bolts 26.

When the parts of the device have been assembled and mounted upon the forward ends of the elliptic springs 14 in the manner shown and described, the buffer-bar and its cushioning devices are supported and maintained in the substantially horizontal position shown, by reason of the attachment of the latter at two separated points on each spring. By reason, however, of the flexible connection between the clamp which embraces the lower leaf of the spring and the rigid lug 12 the cushioning cylinder afforded by the swivel joint 23, 24, and the swiveled bearings of the connecting rod 26 in the lugs 12 and 25, the connections readily adjust themselves automatically to the movements of the springs in travel and the consequent constantly shifting positions of the points of attachment on the spring. When the buffer-bar strikes an obstacle, the shock is absorbed chiefly by the main cushioning springs 9; but, owing to the fact that the cushioning cylinders lie slightly above their pivots 13, there is also a limited tendency to rock said cylinders on the pivot-bolt 13, which latter tendency is yieldingly opposed by the springs 28. When the buffer-bar is freed from contact with the obstacle encountered thereby, the springs 9 automatically return the buffer-bar to normal projected position, while the springs 28 at the same time restore the cushioning cylinders, if tilted, to a normal horizontal position. The in and out travel of the buffer-bar in action is thus maintained substantially horizontal. A very slight rising and falling movement of the buffer-bar may take place under contraction and expansion of the elliptic springs, but the automatic angular flexibility of the connections between the cushioning cylinders and the springs permits this movement to take place without any hindrance to the free action of the latter.

Among the advantages secured by my invention may be mentioned the fact that it acts somewhat as a shock absorber on the elliptic springs, preventing violent recoil or expansion thereof, which often breaks the springs, and also saves the vehicle itself to a large extent from injury resulting from collisions. It also prevents or mitigates the damage that would otherwise result to the person or object collided with.

It will be manifest to those skilled in the art that the device as shown and described might be considerably varied in details without involving any departure from its principle of operation or sacrificing any of the benefits and advantages attained thereby. Hence I do not limit the device to the particular form and construction disclosed, except to the extent clearly indicated in specific claims.

I claim:

1. An automobile buffer, comprising in combination a buffer-bar, cushioning devices carrying said buffer-bar pivotally supported on the elliptic springs of the vehicle, and flexible connections between said cushioning devices and said springs permitting unhindered contraction and expansion of the latter, substantially as described.

2. An automobile buffer, comprising in combination a buffer-bar, cushioning devices carrying said buffer-bar pivoted on the hinge-bolts of the elliptic springs of the vehicle, and flexible connections between said cushioning devices and said springs inwardly of said hinge-bolts permitting unhindered contraction and expansion of said springs, substantially as described.

3. In an automobile buffer, the combination with cushioning cylinders pivotally mounted on the hinge-bolts of the elliptic springs of the vehicle, plungers in said cylinders, and a buffer-bar carried by said plungers, of flexible connections between said cylinders and said springs inwardly of said hinge-bolts maintaining said cylinders in a substantially horizontal position while permitting unhindered contraction and expansion of said springs, substantially as described.

4. In an automobile buffer, the combination with cushioning cylinders pivotally mounted on the hinge-bolts of the elliptic springs of the vehicle, plungers in said cylinders, and a buffer-bar carried by said plungers, of clamps rigidly secured to one leaf of each of said springs, respectively, and angularly yieldable connections between said clamps and said cylinders inwardly of the pivotal connections of the latter to said springs, substantially as described.

5. In an automobile buffer, the combination with cushioning cylinders pivotally mounted on the hinge-bolts of the elliptic springs of the vehicle and provided with apertured lateral lugs, plungers in said cylinders, and a buffer-bar carried by said plungers, of clamps rigidly secured to one leaf of each of said springs, respectively, and provided with apertured lateral lugs, bolts swivelingly mounted in and connecting said cylinder and clamp lugs, and coil springs surrounding said bolts and normally forcing said lugs apart, substantially as described.

6. In an automobile buffer, the combination with cushioning cylinders pivotally mounted on the hinge-bolts of the elliptic springs of the vehicle and provided with rigid apertured lateral lugs, plungers in said cylinders, and a buffer-bar carried by said plungers, of clamps rigidly secured to one leaf of each of said springs, respectively, and provided with apertured radial lugs swiveled therein, bolts swivelingly mounted in and connecting said cylinder and clamp lugs, and coil springs surrounding said bolts and normally forcing said lugs apart, substantially as described.

7. In an automobile buffer, the combination with cushioning cylinders pivotally mounted on the hinge-bolts of the elliptic springs of the vehicle, plungers in said cylinders, and a buffer-bar carried by said plungers, of clamps mounted on one leaf of each of said springs, respectively, said clamps being adjustable both laterally and longitudinally of said springs, and flexible connections between said clamps and said cushioning cylinders, substantially as described.

ALLAN L. McGREGOR.

Witnesses:
SAMUEL N. POND,
FREDERICK C. GOODWIN.